United States Patent
Haines et al.

(10) Patent No.: US 8,560,770 B2
(45) Date of Patent: Oct. 15, 2013

(54) NON-VOLATILE WRITE CACHE FOR A DATA STORAGE SYSTEM

(75) Inventors: Jonathan Williams Haines, Boulder, CO (US); Brett Alan Cook, Westminster, CO (US); Luke William Friendshuh, Elko, MN (US); Mark Allen Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 974 days.

(21) Appl. No.: 12/618,268

(22) Filed: Nov. 13, 2009

(65) Prior Publication Data

US 2011/0119442 A1  May 19, 2011

(51) Int. Cl.
*G06F 12/00* (2006.01)

(52) U.S. Cl.
USPC .......... 711/113; 711/103; 711/156; 711/165; 711/170; 365/185.33

(58) Field of Classification Search
USPC .......... 711/113, 103, 156, 170, 165; 365/185.33
See application file for complete search history.

(56) References Cited

U.S. PATENT DOCUMENTS

| | | | |
|---|---|---|---|
| 6,745,283 B1 * | 6/2004 | Dang | 711/113 |
| 6,850,443 B2 | 2/2005 | Lofgren et al. | |
| 7,047,382 B2 * | 5/2006 | Geiger et al. | 711/165 |
| 7,120,729 B2 * | 10/2006 | Gonzalez et al. | 711/103 |
| 7,409,502 B2 * | 8/2008 | Moyer et al. | 711/134 |
| 7,552,272 B2 * | 6/2009 | Gonzalez et al. | 711/103 |
| 2001/0036115 A1 * | 11/2001 | Rocchi et al. | 365/201 |
| 2004/0193782 A1 | 9/2004 | Bordui | |
| 2006/0106972 A1 | 5/2006 | Gorobets et al. | |
| 2007/0118688 A1 | 5/2007 | Lee et al. | |
| 2007/0283081 A1 | 12/2007 | Lasser | |
| 2008/0195801 A1 | 8/2008 | Cheon et al. | |
| 2008/0235443 A1 | 9/2008 | Chow et al. | |
| 2008/0270681 A1 * | 10/2008 | Van Acht et al. | 711/103 |
| 2008/0276036 A1 * | 11/2008 | Van Acht et al. | 711/103 |
| 2009/0113121 A1 | 4/2009 | Lee et al. | |
| 2009/0172249 A1 | 7/2009 | Matthews | |
| 2010/0299494 A1 * | 11/2010 | Van Acht et al. | 711/166 |
| 2012/0198158 A1 * | 8/2012 | Nikara et al. | 711/118 |
| 2012/0239853 A1 * | 9/2012 | Moshayedi | 711/103 |

* cited by examiner

*Primary Examiner* — Stephen Elmore

(74) *Attorney, Agent, or Firm* — Cesari & Reed, LLP; Kirk A. Cesari; Christian W. Best

(57) ABSTRACT

The present disclosure provides a data storage system. In one example, the data storage system includes a data storage media component having a plurality of data storage locations. A first set of the plurality of data storage locations are allocated for a main data storage area. The data storage system also includes a controller configured to define a write cache for the main data storage area by selectively allocating a second set of the plurality of data storage locations.

17 Claims, 10 Drawing Sheets

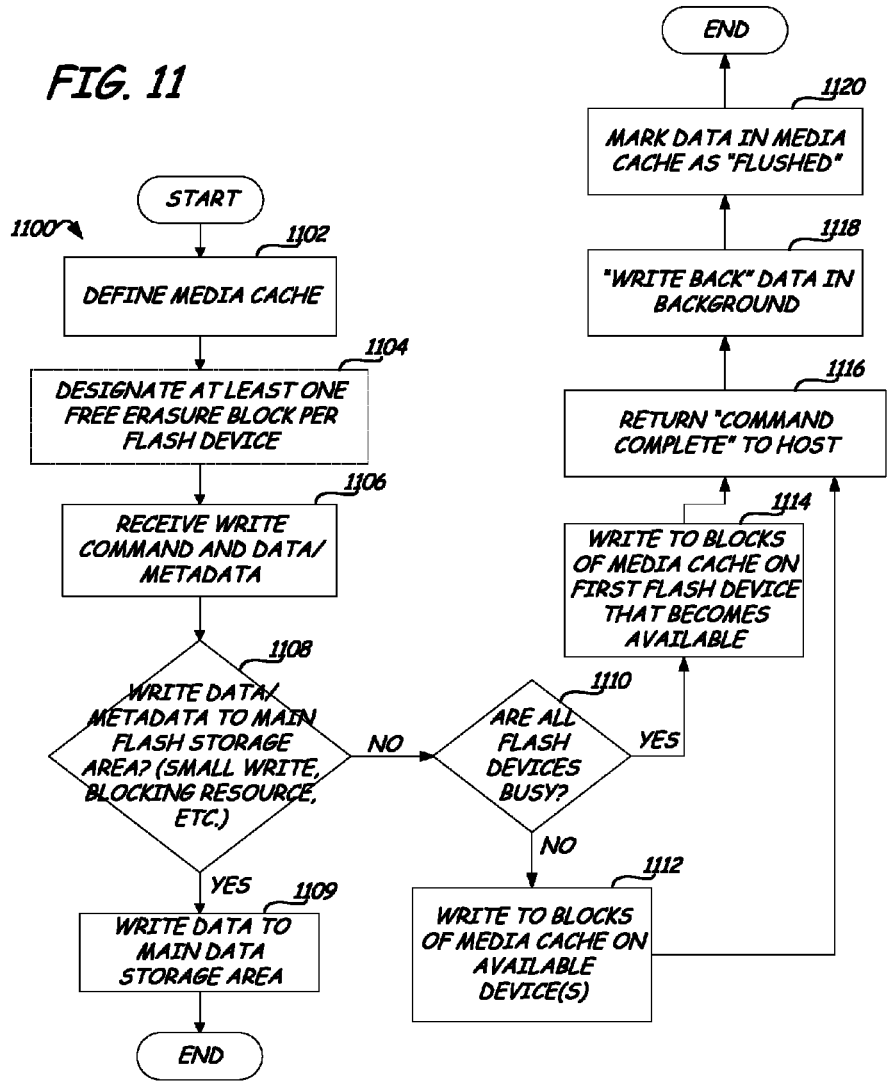

NON-VOLATILE WRITE CACHE FOR A DATA STORAGE SYSTEM

BACKGROUND

The present disclosure relates generally to a non-volatile write cache for a data storage system and more specifically, but not by limitation, to a data storage system having an on-media write cache.

An exemplary data storage system includes one or more devices having at least one medium for data storage. For example, a data storage system can include one or more types of storage media such as, but not limited to, hard discs, floppy discs, magnetic discs, optical discs, magnetic tapes, solid-state storage components, and/or combinations thereof. For instance, an exemplary data storage system can comprise a hard disc drive (HDD), a solid-state drive (SDD), a "hybrid" drive (e.g., a hybrid hard drive (HHD)), to name a few.

In one example, a data storage system includes a controller that is configured to receive data and commands from a host and implement data operations to the storage media in the data storage system based on the commands. The data storage system can include a plurality of devices and components having memory accessible by the controller. For instance, a solid-state drive (SDD) can include a plurality of data memory devices, such as flash memory chips, having solid-state memory accessible by a controller of the solid-state drive (SDD).

The discussion above is merely provided for general background information and is not intended to be used as an aid in determining the scope of the claimed subject matter.

SUMMARY

In one exemplary embodiment, a data storage system is provided. The data storage system includes a data storage media component having a plurality of data storage locations. A first set of the plurality of data storage locations are allocated for a main data storage area. The data storage system also includes a controller configured to define a write cache for the main data storage area by selectively allocating a second set of the plurality of data storage locations.

In one exemplary embodiment, a controller is provided and includes a host interface for receiving commands and data from a host and a memory interface for providing the data to at least one data memory device. The at least one memory device includes data storage media having a plurality of data storage locations. The controller is configured to define a write cache in the data storage media by selectively allocating a set of the plurality of data storage locations. The write cache is configured to be utilized to cache the data to be written to a main data storage area of the data storage media.

In one exemplary embodiment, a method is provided. The method includes defining a media cache by selectively allocating a first set of blocks of a data storage medium and using the first set of blocks for caching data to be stored to a main storage area of the data storage medium. The method also includes re-defining the media cache by selectively allocating a second set of blocks of the data storage medium. The first set of blocks is different than the second set of blocks.

These and various other features and advantages will be apparent from a reading of the following detailed description.

BRIEF DESCRIPTION OF THE DRAWINGS

FIG. 11 is a flow diagram illustrating a method for using a media cache, under one embodiment.

DETAILED DESCRIPTION

The present disclosure relates generally to a non-volatile write cache for a data storage system and more specifically, but not by limitation, to a data storage system having an on-media write cache. To date, storage systems have utilized cache memory that is separate and distinct from the mass storage media. The present inventors have recognized the ability to define and allocate areas of the main data storage to form a write cache. Various applications of such on-media write cache will be appreciated from the descriptions provided herein.

Figure 1:
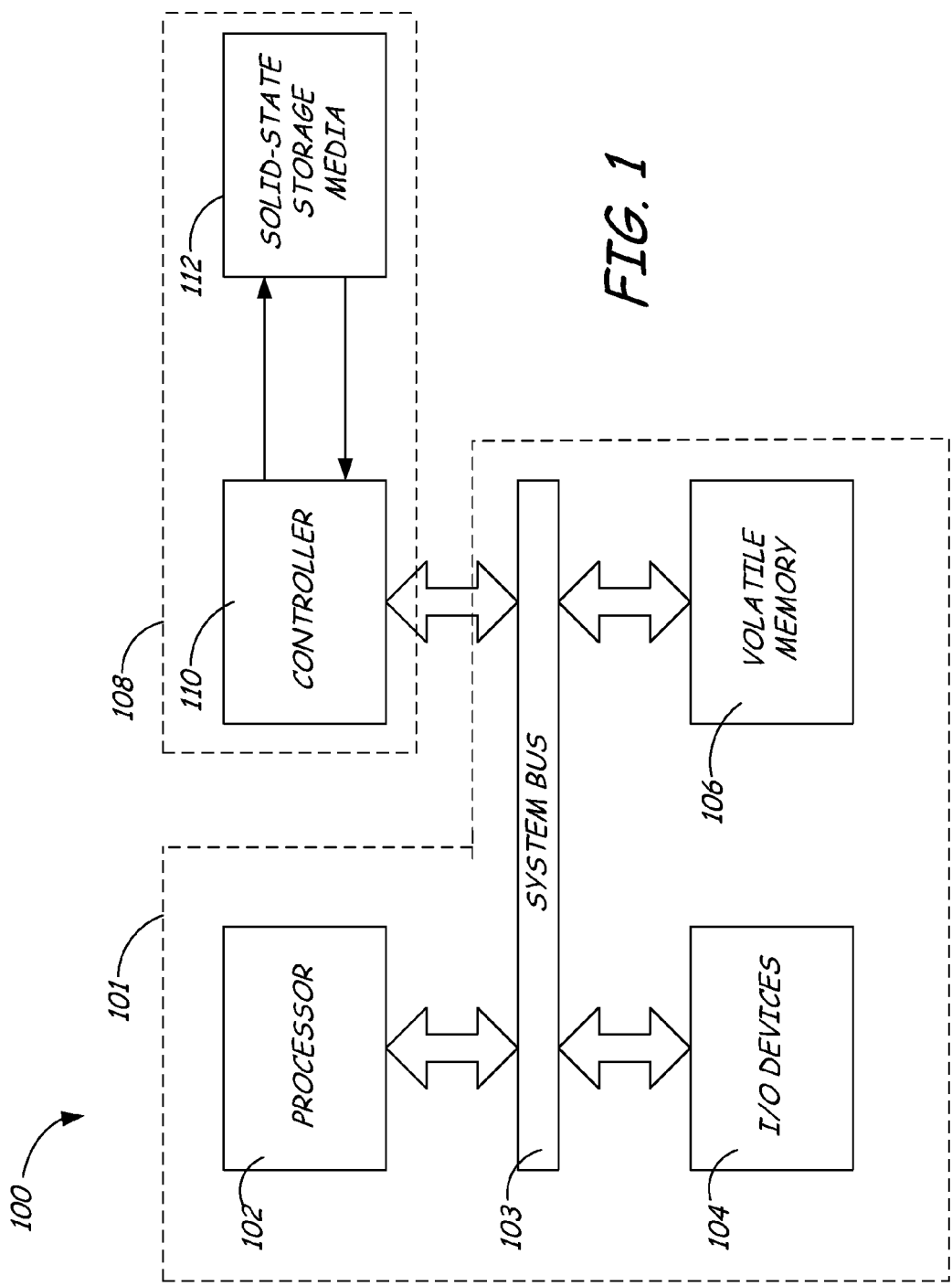
FIG. 1 is a schematic diagram illustrating an exemplary data storage system.

FIG. 1 is a schematic diagram of a data computing system 100 including an exemplary data storage system 108. As illustrated, a host system 101 includes a processor 102 connected to a system bus 103 which also can be connected to input/output (I/O) devices 104, such as a keyboard, monitor, modem, storage device, or pointing device. The system bus 103 is also coupled to a memory 106, which can include a random access volatile memory, such as dynamic random access memory (DRAM). The system bus 103 is also coupled to the data storage system 108 for communicating data and/or commands between data storage system 108 and host system 101.

Data storage system 108 includes a controller 110, which can be coupled to the processor 102 via a connection through the system bus 103. It is noted that in some systems this connection is made through one or more intermediary devices, such as a host bus adapter or a bridge.

Controller 110 communicates with storage media 112 component over one or more channels (e.g., buses). In the illustrated embodiment, storage media component 112 comprises one or more solid-state data memory devices (such as flash memory) that include a plurality of data storage blocks for storing data provided by controller 110.

In one example, data storage system 108 comprises a solid-state drive (SSD) and storage media 112 comprise storage blocks of semiconductor-based devices. Alternatively, or in addition, storage media 112 can also include volatile and/or non-solid-state memory. For example, data storage system 108 can comprise a hard disc drive (HDD) and/or a "hybrid" drive (e.g., a hybrid hard drive (HHD)) including solid-state components and hard disc components. Data storage system 108 can include hard discs, floppy discs, magnetic discs, optical discs, magnetic tapes, and/or other types of solid-state storage components (such as, but not limited to, dynamic random access memory (DRAM), static random access memory (SRAM), and the like).

Figure 2:
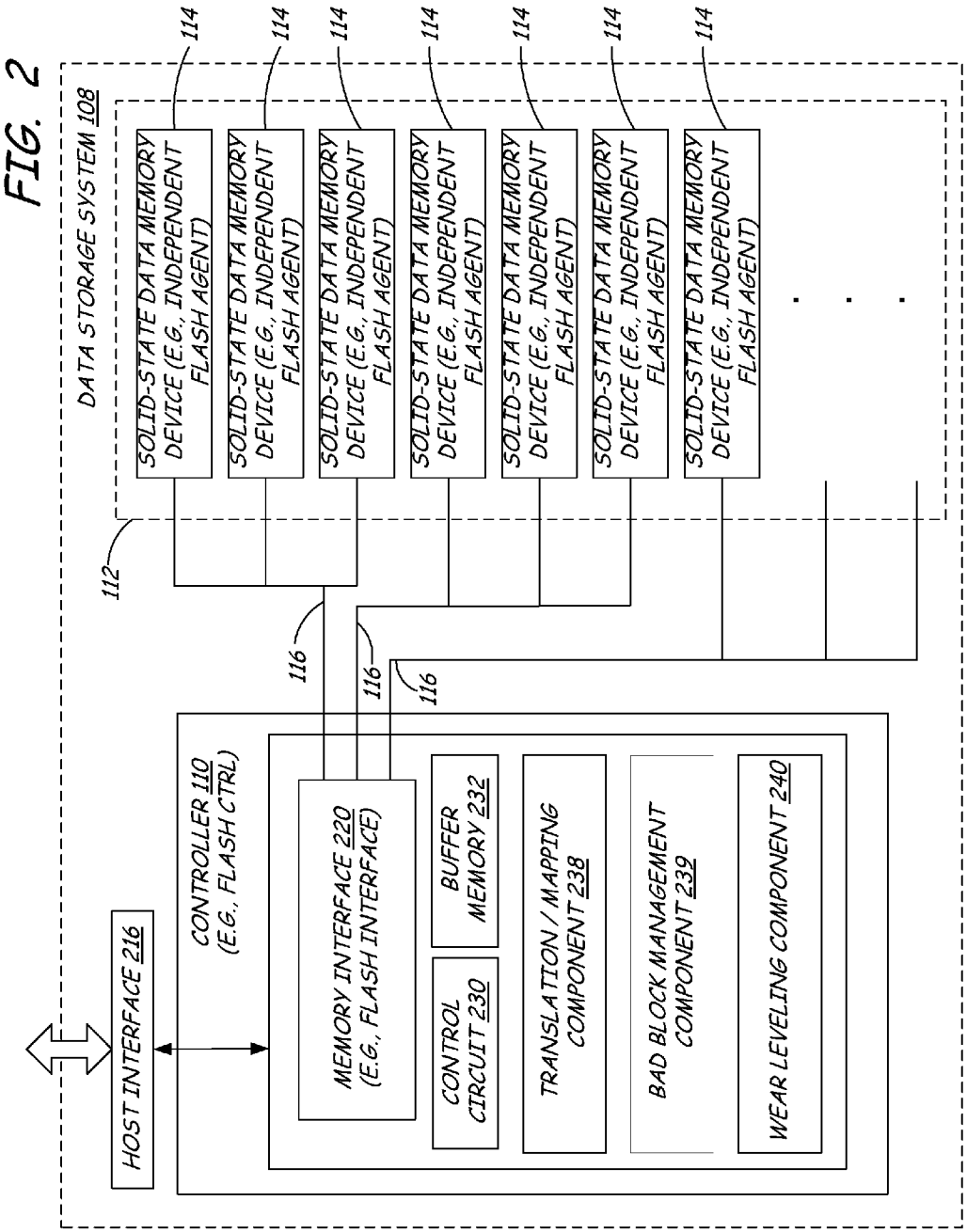
FIG. 2 is a schematic diagram illustrating one embodiment of the data storage system shown in FIG. 1.

FIG. 2 is a schematic diagram illustrating one embodiment of data storage system 108. Data storage system 108 includes controller 110 that is configured to store information to and retrieve information from solid-state storage media (illustratively flash memory) 112. In one embodiment, solid-state storage media 112 comprises a plurality of memory devices 114, each device 114 having a plurality of data storage locations (e.g., blocks, pages, etc.).

In one example, each of the devices 114 comprise an independent flash agent that is able to perform a data operation, or portion thereof, associated with a command received by the controller. For example, each flash agent 114 is configured to perform all, or a portion of, a data read, a data write operation, etc. Further, the data operation does not have to include a data transfer. For example, the data operation can include a data erase operation, such as an erase operation on a flash chip.

In one embodiment, each device 114 is identified by an assigned logical unit number (LUN). For instance, each device 114 can comprise one or more flash chips, for example. Alternatively, or in addition, one or more flash devices 114 can be provided on the same flash chip. In this manner, multiple logical storage units can be provided within a single die or package, for example. For instance, each flash device 114 can include a separate flash chip comprising a semiconductor package having one or more semiconductor dice provided in a housing, for example.

Each device 114 can include an interface (i.e., for communicating information with memory interface 220), control circuitry, and a storage area having a particular capacity based on the design of the device components. For example, in one embodiment the storage area of one or more flash devices 114 is capable of storing 1 mebibyte (MiB). In another embodiment, one or more flash device 114 are configured to store more than or less than 1 MiB.

However, it is noted that solid-state storage media 112 can have any suitable physical and logical structure. For instance, each of data memory devices 114 can be provided on the same semiconductor die (e.g., the same piece of silicon). In another instance, one or more of data memory devices 114 are provided on different semiconductor die (e.g., different pieces of silicon). Further, it is noted that data storage system 108 can include any number of data memory devices 114. For example, in one embodiment data storage system 108 includes 4 to 256 data memory devices 114. However, less than 4 or more than 256 data memory devices 114 can be utilized.

Controller 110 includes memory interface 220 (illustratively a flash memory interface) that is coupled to the data memory devices 114 via one or more channels (e.g., busses) 116 for communicating commands and/or data. In one embodiment, channels 116 comprise 1 to 24 flash channels. However, any number of channels and/or connection topologies can be utilized. Channels 116 can comprise data busses, address busses, and/or chip select busses, for example.

While FIG. 2 illustrates a particular channel configuration, it is noted that the attachment methodology between the controller 110 and data memory devices 114 can be of any suitable form.

The controller 110 is communicatively coupled to a host, such as host system 101 illustrated in FIG. 1, via a host interface 216 that can receive and send commands, status information, and data to the host. The host interface 216 can pass commands to a control circuit 230 of controller 110 for processing and also store received data in a buffer memory 232. The buffer memory 232 provides the received data to the memory interface 220.

The memory interface 220 can receive data from the buffer memory 232 to be written to one or more of the data memory devices 114 and receive address bits from the control circuit 230. The memory interface 220 can assert corresponding data and address bits with appropriate timing and format to a selected data memory device 114. Memory interface 220 can also receive stored data from any storage locations (e.g., pages, blocks, etc.) of data memory devices 114.

In accordance with one embodiment, to perform data operations with data storage system 108, a host system operates on logical block addresses (LBAs) that identify the data within the host system (or logical) space. In other words, the logical block address (LBA) is the address that the host system uses to read or write a block of data to data storage system 108. To store, retrieve, and/or access data in the data storage system 108, host commands are generally issued to the data storage system 108 using a logical block convention which identifies the logical addresses.

The physical block address (PBA) is the fixed, physical address of a block in the memory 112. In one example, the controller 110 can store a mapping of the logical addresses to the corresponding physical addresses in a translation/mapping component 238. The mapping information is utilized for data operations (i.e., data writes, data reads, data accesses) to locate the appropriate data storage locations (e.g., sectors, pages, blocks) within the data storage system 108. The translation/mapping component 238 carries out a conversion of the logical block address (LBA) to locate the associated physical blocks within the data storage system 108. Data access, write, read, and/or erase operations are performed on memory locations in the data storage system 108 based on the physical block address.

In one embodiment, the logical-to-physical block mapping information is stored in controller 110. In another embodiment, component 238 operates as a cache for the logical-to-physical block mapping information. For instance, the mapping information can be stored to or otherwise associated with data memory devices 114. In this manner, the mapping information can be fetched from (on a read) or updated to (on a write) the solid-state data memory device(s) associated with the command.

Figure 3:
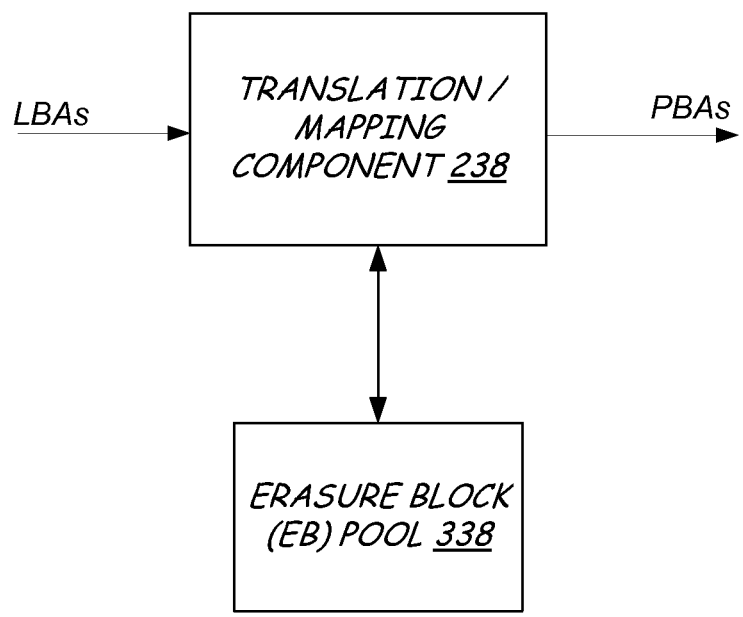
FIG. 3 is a schematic diagram illustrating one embodiment of the translation/mapping component shown in FIG. 2.

FIG. 3 illustrates one example of translation/mapping component 238. Translation/mapping component 238 can include any suitable data structure for storing the logical-to-physical address mapping information. As illustrated, component 238 is configured to receive a logical address (or addresses) as an input and identify corresponding physical address (or addresses). For example, when a host system issues a read command for a particular logical block address (e.g., LBA 1000), translation/mapping component 238 identifies the physical block address(es) (PBAs) in the data storage component where the requested data (LBA=1000) is stored. The data storage system accesses the data based on the PBAs.

For a write command, controller 110 utilizes translation/mapping component 238 to identify physical block addresses (PBAs) for storing the write data. In one example, the target physical blocks are re-written with the data (e.g., by first erasing the target physical blocks then storing the write data). In another example, component 238 can allocate available (e.g., spare) data blocks from an erasure block (EB) pool 338 for storing the write data. In one particular example, component 238 selects available data blocks from erasure block pool 338 based on erasure counts of the data blocks.

When data blocks are erased in media 112, the data blocks can be placed in the erasure block pool 538. In one example, the erasure block pool 538 comprises blocks in flash storage media component 112 that have been erased and are not currently mapped or allocated to LBAs. In flash media, for example, a block of old data is typically erased by erasing all of the bits in the block. All of the bits end up in a single state. Typically this state is set "1". Subsequent writes can change bits of the block to the other state, typically "0".

Referring again to FIG. 2, controller 110 also includes a bad block management (BBM) component 239 that maintains a record of data storage blocks within media 112 that contain one or more invalid bits, where the reliability of the data storage block cannot be guaranteed. "Bad" blocks can be present when the media 112 is manufactured or can develop during the lifetime of the media 112. In one embodiment, BBM component 239 creates a bad block table by reading areas in the media 112. The table is stored, for example, in a spare area of the media 112 and can be loaded into RAM upon booting of the data storage system 108. The blocks that are contained in the bad block table are not addressable by a logical address. As such, if translation/mapping component 238 addresses one of the bad blocks identified by the bad block table, the BBM component 239 redirects the operation and re-maps the block address by allocating a new or spare block in media 112. For example, BBM component 239 can assign an available block from erasure block pool 338.

Bad blocks can be determined in any of a number of ways. For example, a Status Register can be maintained that indicates whether an operation (i.e., a programming operation, a erase operation) is successful. A threshold number of unsuccessful operations can be used to indicate that a block should be marked as "bad" in the bad block table. Alternatively, or in addition, an Error Correction Code (ECC) algorithm can be employed to determine if a block contains a threshold number of uncorrectable errors and should be placed in the bad block table. Alternatively, or in addition, bad blocks can be identified based on erasure counts (i.e., the number of times a block has been erased).

There are many types of data storage components that can be utilized in data storage system 108, such as (but not limited to) the types of components mentioned above. In some instances, the particular physical structure and configuration of the data storage components include memory locations that are susceptible to degradation. For example, in some cases a data storage component is limited by a maximum number of write, read and/or erase cycles that the storage component can perform. For instance, flash memory is especially susceptible to degradation as it is common for flash memory to have wear-out mechanisms within their physical structures. In particular, data storage locations within flash memory can experience failure after a cumulative number of erase cycles. In one flash memory example, data is erased in blocks that have a limited number of erase cycles (e.g., 10,000, 100,000, 1,000,000, etc.).

In accordance with one embodiment, controller 110 includes a wear leveling component 240 that is configured to distribute data operations across blocks in media 112 to prolong the service life of media 112. In one example, wear leveling component 240 manages data operations and the data storage blocks within media 112 so that erasures and re-writes are distributed evenly (or at least substantially evenly) across the blocks in media 112. For example, component 238 can include wear leveling component 240 and can assign LBAs to PBAs based on erasure counts of available data storage blocks in media 112. In this manner, wear leveling component 240 reduces, or prevents, individual blocks in the flash memory from prematurely failing due to a high concentration of write and/or erase cycles.

Figure 4:
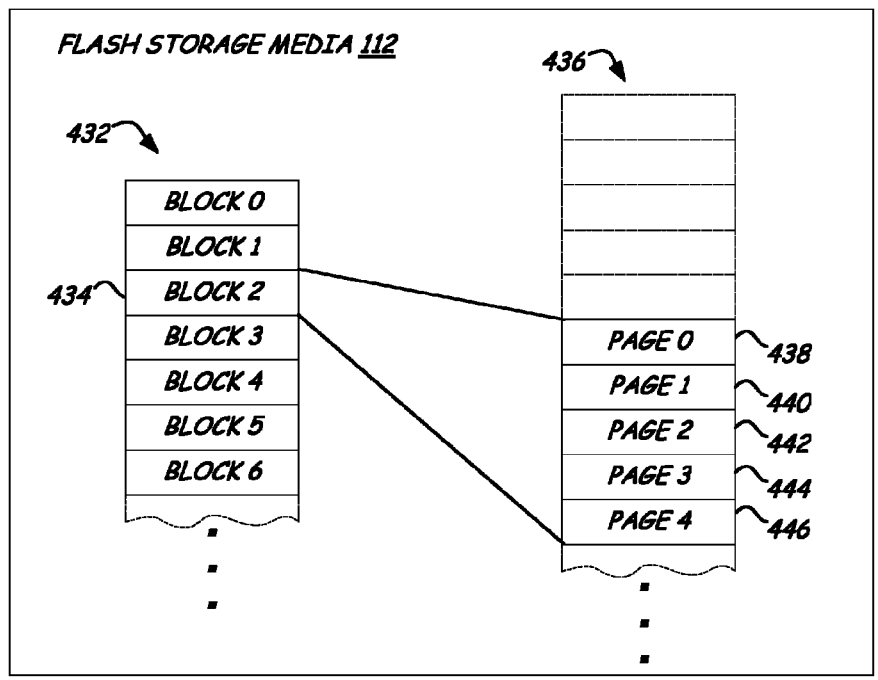
FIG. 4 illustrates storage locations within an exemplary flash storage media component.

FIG. 4 illustrates storage locations within flash media 112, under one embodiment. Flash media 112 includes a plurality of blocks 432 that are divided into a plurality of pages (or sectors) 436. Blocks 432 can be associated with the same data memory device 114 and/or can be distributed across multiple data memory devices 114, for example.

As illustrated in FIG. 4, an exemplary block 434 is divided into a plurality of exemplary pages 438-446. In one example of a NAND flash device, the memory space can be divided into blocks that include 32 pages that each comprise 512 bytes (B) of storage. Thus, the block size in one exemplary NAND flash device is 16 kibibytes (kiB). However, it is noted that flash media 112 can be divided into blocks and pages having any desired size and configuration. For instance, pages 436 can be, but are not limited to, 1,024, 2,048 or 4,096 bytes in size.

Figure 5:
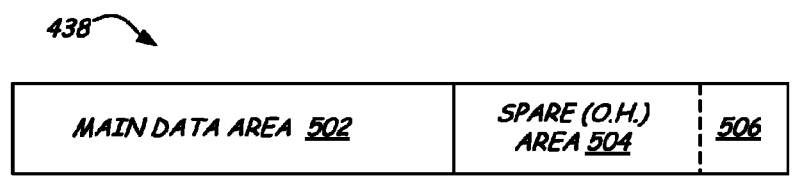
FIG. 5 illustrates one embodiment of a storage location within the flash storage media component of FIG. 4.

FIG. 5 illustrates exemplary page 438 of block 434. Page 438 includes a user data region 502 for storing user data, metadata, etc., and a spare region 504 that is configured to store additional data pertaining to the data stored in user data region 502. For example, spare region 504 can include error correction code (ECC) and/or an identifier that indicates logical block address(es) associated with the user data stored in the user data region 502.

In accordance with one embodiment, the data storage system 108 maintains an erasure count for each block 432 of media 112. The erasure count indicates a number of times that the block has been erased and can be used by the data storage system 108 for wear leveling, etc. In one embodiment, controller 110 maintains a database of the erasure counts. In the embodiment illustrated in FIGS. 4 and 5, the erasure counts are stored in a portion of the data blocks 432. For instance, a portion of each block (for example, a portion 506 of a page 438 of block 434) can be allocated to store the erasure count information.

In an exemplary flash memory, programming is performed on a page basis while erase operations are performed on a block basis. Thus, each page of a particular block can be written to separately from other pages of the block while an erasure of a block erases data in all pages of the block.

In exemplary flash media 112, each page 436 can be "partially programmed" by indicating a portion of the page 436 to be programmed. For instance, a first portion (e.g., the first m bytes) of the page 436 can be written to during a first operation while a second portion (e.g., a next n bytes) of the page 436 can be written to during a second, subsequent operation. In some instances, flash media 112 includes a partial page programming limit which restricts the number of times a page can be partially programmed. For example, in one embodiment of flash media 112 each page 436 of flash media 112 can be partially programmed a particular number of times (e.g., 4 times), after which additional partial programming operation may disturb the bits stored in the page.

In accordance with one embodiment, data storage system 108 includes a write cache that is configured to be used for caching and/or buffering data in the data storage system 108. For example, the write cache is utilized for temporary storage of user data and/or metadata relating to user data that is to be stored to a "main" data storage area. The "main" data storage area comprises, for example, physical data blocks of media 112 that are mapped to logical block addresses by component 238. In one embodiment, the write cache includes non-volatile memory such that data in the write cache persists when power to the data storage system 108 is removed.

The write cache can operate to improve operations within data storage system 108. For instance, as mentioned above, blocks in a solid-state media, such as flash memory, can be subject to a partial page programming limit. In accordance with one embodiment, the write cache is utilized to temporarily store smaller sized sequential write data. Once several smaller portions of sequential write data have been accumulated in the write cache, the accumulated write data is provided from the write cache to the main data storage area. In this manner, larger amounts of data can be stored to the media while avoiding or limiting partial page programming limit issues.

In accordance with another embodiment, the write cache can be utilized to improve performance of data operations in data storage system 108 where a "blocking" resource is present. For example, a "blocking" resource can comprise a data memory device (e.g., data memory device 114) that is busy servicing a prior data operation and is unable to immediately service a current data operation (e.g., data request, data read, data write, data move, block erasure, etc.). In another instance, a "blocking" resource can comprise a component that is blocked by host protocol. For example, the host protocol can block a resource from servicing a data write request until the write operation is "power-safe."

It is noted that these are examples of uses for a write cache and are not intended to limit the scope of the concepts described herein.

In accordance with one embodiment, the write cache comprises a "media cache" that includes a set of data storage locations of the storage media (i.e., data storage locations or blocks of storage media 112). The "media cache" thus comprises a portion or subset of the total data blocks of the storage media and is designated for caching data to be written to a main data storage area (i.e., a different portion or subset) of the storage media. In one embodiment, the media cache can be thought of as being a data block set that is carved out of the data blocks of the data storage media. The media cache can include contiguous and/or non-contiguous data blocks of the storage media During operation, the data blocks allocated for the media cache can experience greater wear (e.g., more erasure cycles) than data blocks allocated for the main data storage area. In accordance with one embodiment, controller 110 re-allocates the media cache to different data blocks of media 112 periodically (i.e., regular and/or irregular intervals). For example, the controller 110 can re-allocate the media cache based on erasure counts, thereby providing a form of wear-leveling for the data blocks of media 112. Thus, at one instance in time a particular data block of media 112 can be allocated for the media cache and, at another instance in time, the particular data block can be allocated for the main data storage area.

Figure 6:
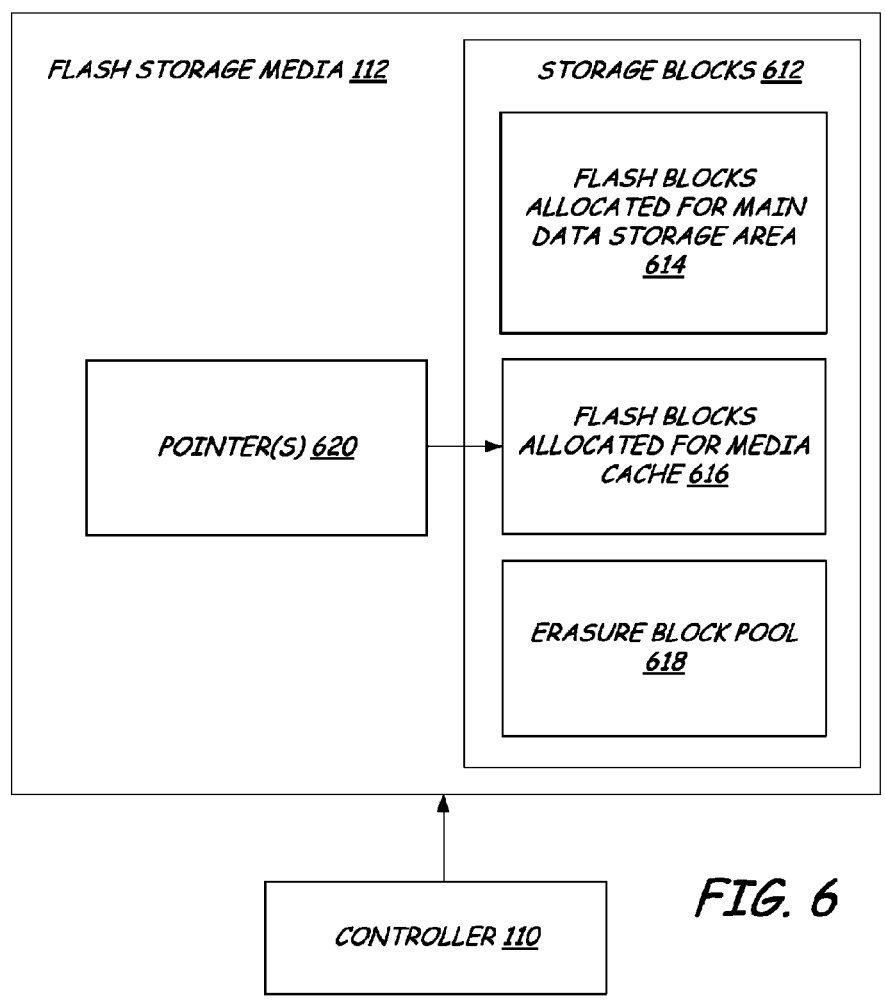
FIG. 6 is a schematic diagram illustrating one embodiment of an exemplary flash storage media component.

FIG. 6 illustrates one embodiment of flash media 112 including both a main data storage area and a media cache. Flash media 112 comprises a plurality of data storage blocks 612, such as blocks 432. Storage blocks 612 can comprise storage blocks of one or more data memory devices, such as solid-state data memory devices 114 illustrated in FIG. 2.

As illustrated, a first set of the flash blocks 112 are allocated for the main data storage area 614 and a second set of the flash blocks are allocated for the media cache 616. In one embodiment, the media cache 616 comprises a resource that logically resides between the main storage area 614 on the flash media 112 and a higher level cache, for example.

In the embodiment illustrated in FIG. 6, the flash blocks allocated for main media storage (block 614) and the flash blocks allocated for the media cache (block 616) comprise portions of the same flash media 112. As discussed below, the flash blocks 614 can be on a single flash device (e.g., a particular data memory device 114) and/or can be distributed across a plurality of flash memory devices (e.g., a number of data memory devices 114). Similarly, flash blocks 616 can be on a single flash device and/or distributed across multiple flash devices.

In the illustrated embodiment, blocks from erasure block pool 618 can be allocated for main storage area 614, as needed. Erasure block pool 618 is illustratively similar to erasure block pool 338 illustrated in FIG. 3 and comprises a number of storage blocks in flash media 112 that have been erased and are available for data storage. In accordance with one embodiment, the flash blocks in media cache 616 are also allocated from the erasure block pool 618. In this manner, media cache 616 comprises a journal space that is allocated out of the same erasure block pool or set as the blocks for main data storage area 618. Flash blocks of media cache 616 that are no longer being used for media cache 616 (for example, when media cache 616 is re-allocated) can be placed in erasure block pool 618.

In one embodiment, flash media 112 includes pointer(s) 620 that are utilized by controller 110 to locate one or more of the flash blocks of media cache 616. For example, pointer(s) 620 include at least a root pointer that is locatable by controller 110 and at least one additional pointer that points to a first flash block of media cache 616. Additional pointers can be utilized to identify and other flash blocks of media cache 616. For example, the additional pointers can include pointers stored in media cache 616. For instance, each of the flash blocks in media cache 616 can include a pointer stored in the flash block that points to a next flash block in media cache 616.

Figure 7:
FIG. 7 illustrates a process of defining a media cache, under one embodiment.

FIG. 7 illustrates an exemplary allocation of data blocks for media cache 616. In accordance with the illustrated embodiment, media cache 616 comprises a "pooled" flash resource 716 that allocates or pools data blocks across one or more data memory devices in the data storage system 108. For example, controller 110 can selectively allocate available blocks from the erasure block pool 618. This is illustrated by dashed lines 717. The blocks allocated for media cache 616 can comprise multiple blocks from the same data memory device (e.g., a particular memory device 114) and/or blocks from multiple data memory devices (e.g., multiple memory devices 114). In one particular example, at least one data block is allocated from each data memory device 114 of data storage system 108. For instance, in FIG. 7 reference numerals 718-1, 718-2, and 718-3 represent erasure blocks on first, second, and third data memory devices, respectively. Of course, flash media 112 can include additional data memory devices (i.e., more than three).

Figure 8:
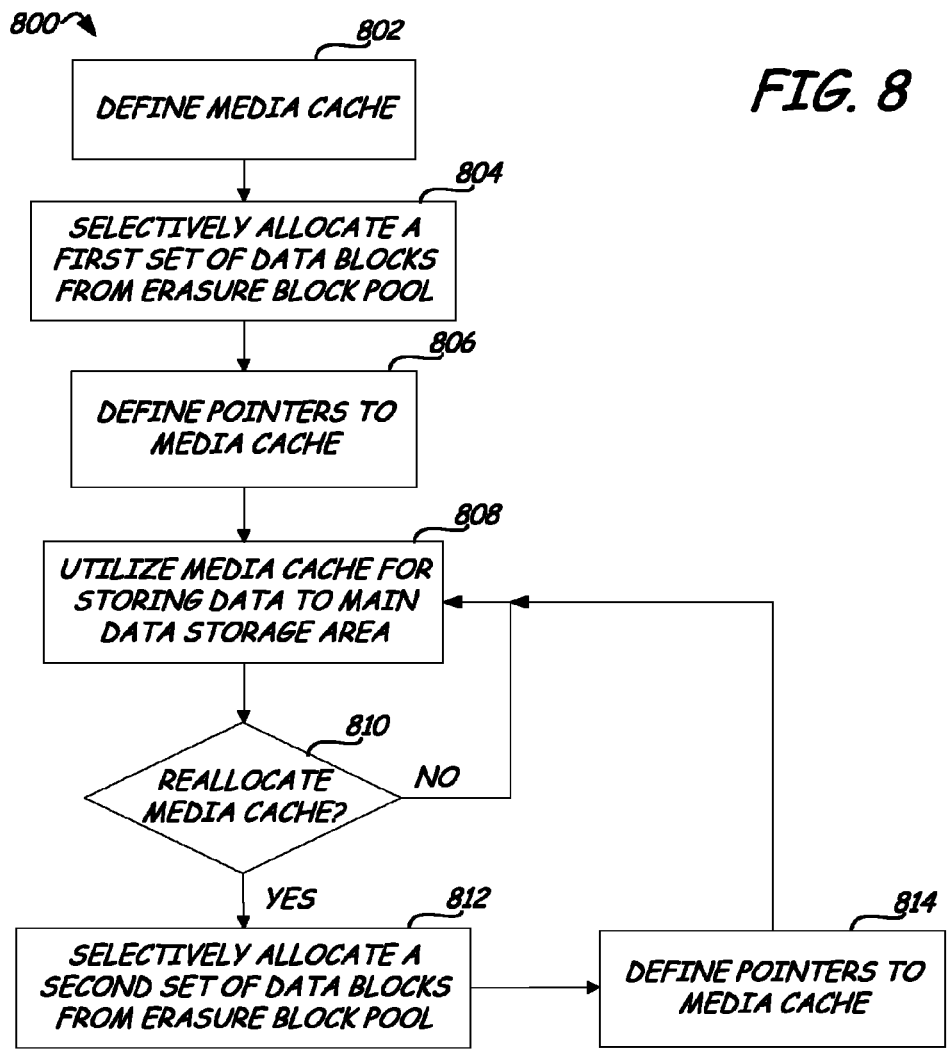
FIG. 8 is a flow diagram illustrates a method of allocating data blocks for a media cache, under one embodiment.
Figure 9:
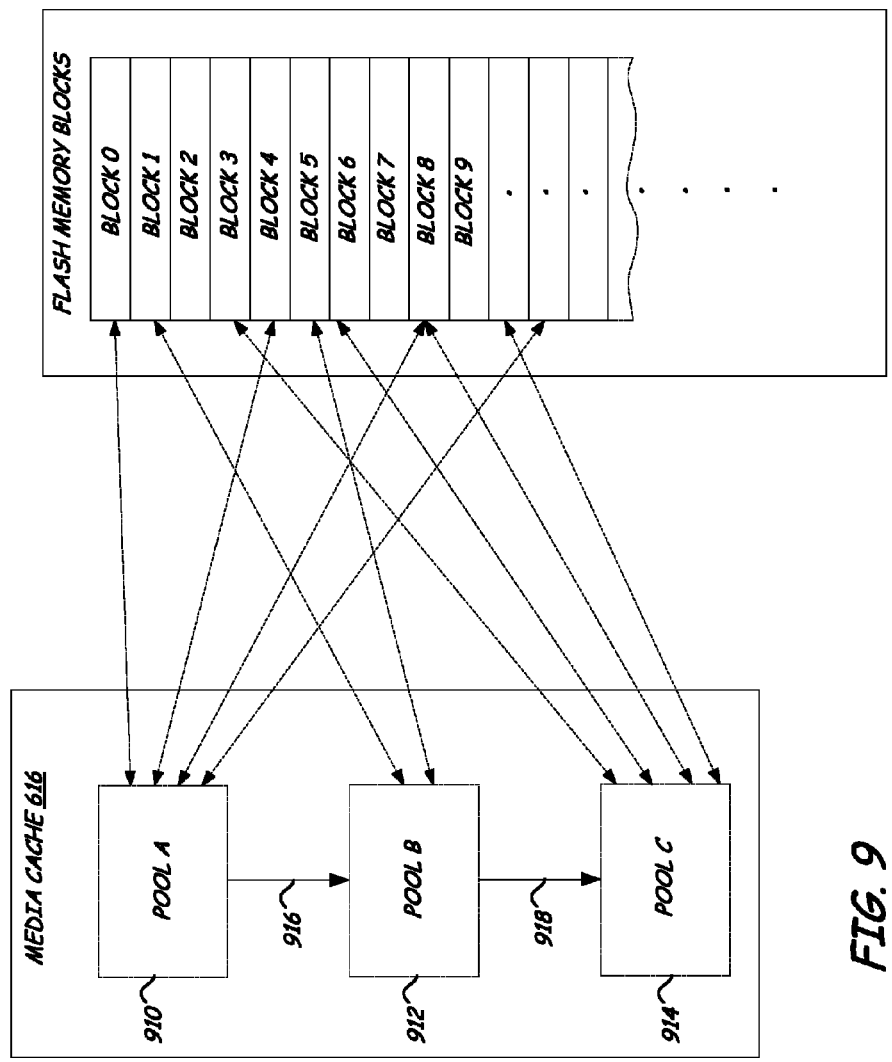
FIG. 9 is a schematic diagram of an exemplary media cache.

FIG. 8 illustrates a method 800 for allocating data storage blocks for media cache 616. At step 802, the media cache is defined. In one embodiment, this can include a step 804 of selectively allocating a first set of data blocks from the erasure block pool 618. An exemplary first set of data blocks allocated for the media cache 616 is illustrated in FIG. 9 at block 910. The first set of data blocks is illustrated as "Pool A" and comprises at least one erasure block allocated from the erasure block pool 618. In one embodiment, all of the blocks for media cache 616 are allocated at the same (or substantially the same) time. Alternatively, or in addition, data blocks can be allocated from erasure block pool 618 at different, later instances. For example, data blocks can be allocated for media cache 616 as needed (e.g., when write data is received).

At step 806, pointer(s) to the media cache are defined. In one embodiment, at least one pointer identifies a start of the media cache 616 (i.e., a first data block of the media cache 616).

At step 808, the media cache 616 can be utilized for temporary storage of write data (i.e., data to be written to main data storage area 614). If additional data blocks are needed in the media cache 616 (e.g., all data blocks allocated for the media cache 616 are full) the method can include allocating additional data blocks from the erasure block pool 618.

At step 810, the method includes determining whether to redefine the media cache 616 by reallocating data blocks for the media cache 616. For example, the media cache 616 can be reallocated from the erasure block pool 618 in response to one or more conditions or parameters associated with the media cache 616. For instance, the media cache 616 can be reallocated if the size of the media cache 616 reaches a predefined threshold (e.g., a number of data blocks in the media cache 616 reaches a particular number or percentage of the overall data blocks in flash media 112). In another embodiment, step 810 can include reallocating data storage blocks for the media cache 616 in response to a threshold number of erasure cycles. For example, the media cache 616 can be reallocated to a different set of data blocks selected from the erasure block pool if the erasure counts for one or more data storage blocks in the current media cache (i.e., the first set allocated at step 804) reaches a threshold. Alternatively, or in addition, the media cache 616 can be reallocated after a particular period of time. It is noted that these are examples of parameters or conditions for reallocating the media cache 616, and are not intended to limit the scope of the concepts described herein.

If the media cache 616 is to be reallocated, the method proceeds to step 812 wherein a second set of data blocks are selectively allocated from the erasure block pool 618. Step 812 can include transferring some or all of the data in the current media cache (i.e., the first set of data blocks allocated at step 804) to the new, reallocated media cache (i.e., the second set of data blocks allocated at step 812). At step 814, pointer(s) to the reallocated media cache (i.e., the second set of data blocks) are defined.

In one embodiment, at step 812 the first set of data blocks are marked for erasure (prior to the first set of data blocks being erased and placed in the erasure block pool 618) by storing information in the second set of data blocks (i.e., the reallocated media cache). For example, information marking the first set of data blocks for erasure can be stored in the metadata of the second set of data blocks until the reallocation is complete (e.g., the pointers are reallocated at step 814). Thereafter, the stored information can be utilized to place the first set of data blocks in the erasure block pool 618. This can be advantageous, for example, in the event that power is lost during the reallocation process, before the pointers to the reallocated media cache are defined.

In accordance with one embodiment, the method 800 selectively allocates data blocks for the media cache 616 from the erasure block pool 618 based on erasure counts. For example, the controller 110 identifies an available data block in the erasure block pool 618 having the lowest erasure count.

FIG. 9 illustrates exemplary reallocations of data blocks for media cache 616. Block 910 illustrates a first set or pool of data blocks allocated for the media cache 616 at a first instance in time. Block 912 illustrates a second set or pool of data blocks allocated for the media cache 616 at a second instance in time. Block 914 illustrates a third set or pool of data blocks allocated for the media cache 616 at a third instance in time. Arrows 916 and 918 illustrate reallocation of the data blocks for the media cache 616, such as the process illustrated with respect to steps 810-814 in FIG. 8.

One or more of data block pools 910, 912, and 914 can include different and/or some of the same data blocks of flash media 112, depending on the particular erasure counts of the erasure blocks in the erasure block pool 618 when the reallocations (i.e., arrows 916 and 918) occur. In accordance with one embodiment, the process of reallocating the media cache 616 provides for wear leveling of data blocks in the data storage system 108 such that particular data blocks are not utilized excessively (i.e., significantly increasing the amount of wear of the data blocks with respect to other data blocks in the media 112).

Figure 10:
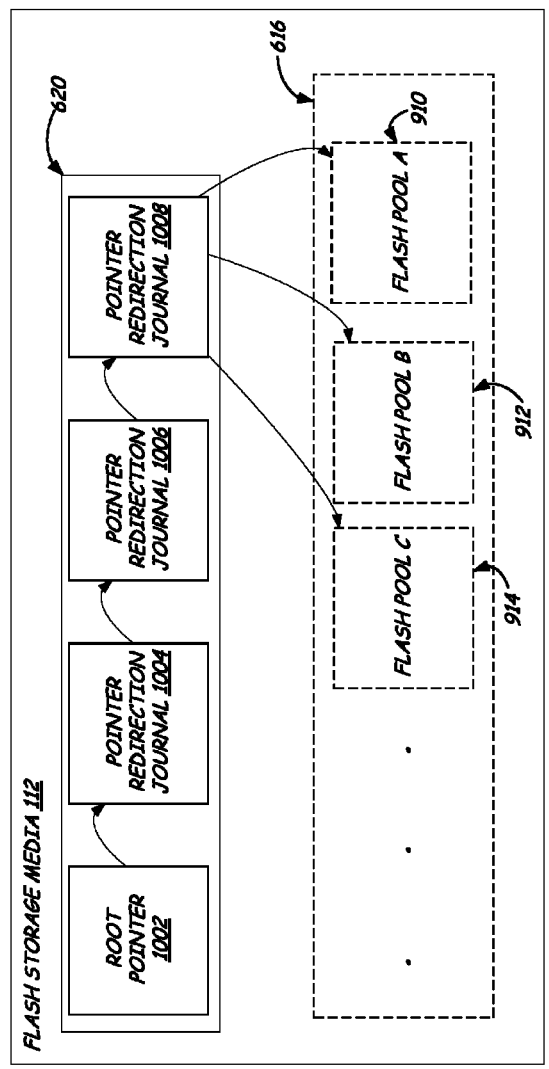
FIG. 10 is a schematic diagram of a flash storage media component including a plurality of pointers to a media cache, under one embodiment.

FIG. 10 illustrates one embodiment of pointer(s) 620 to media cache 616. As illustrated, pointer(s) 620 comprise four pointers 1002-1008. However, it is noted that this is one example and that more than or less than four pointers can be utilized. Pointer(s) 620 include a root pointer 1002 and a number of pointer redirection journals 1004-1008. Pointers 1002, 1004 and 1006 point to subsequent pointers in the pointer chain 620. The last pointer 1008 in the pointer chain 620 identifies the currently allocated media cache 616. For example, at a first instance in time, pointer 1008 points to flash pool 910. At a second (i.e., later) instance in time, pointer 1008 points to the second flash pool 912. At a third (i.e., later) instance in time, pointer 1008 points to the third flash pool 914. Thus, as the media cache 616 is reallocated to include different subsets of the data blocks of flash media 112, pointer 1008 is updated such that controller 110 can locate the media cache 616.

In one embodiment, each pointer in pointer chain 620 is stored to a data block of flash storage media 112. For example, pointer 1008 is stored to a first data block of storage media 112. The first data block comprises a plurality of pages, for example 64 pages. The pointer to flash pool 910 is stored in a first page of the first data block. When the media cache 616 is reallocated, pointer 1008 is updated to point to the second flash pool 912. The updated pointer is stored to a second page of the first data block. Similarly, the pointer to flash pool 914 is stored in a third page of the first data block. When the updates to pointer 1008 fill the first data block (i.e., pointer 1008 is updated 64 times in the above example), pointer 1008 is moved to an available data block, for example a data block selected from erasure block pool 618. Pointer 1006 is updated to point to the new data block containing pointer 1008. This is done by storing the updated pointer to another page of a second data block containing pointer 1006. Again, pointer 1008 can be repeatedly updated until the data block storing pointer 1008 is full. Pointer 1008 is again moved to an available data block and pointer 1006 is updated. When the pages of the second data block containing pointer 1006 become full, pointer 1006 is also moved to an available data block and pointer 1004 is updated. Pointer 1002 is updated when a third data block containing pointer 1004 becomes full and pointer 1004 is moved.

Pointer 1002 comprises a "root" pointer that is identifiable by the controller 110. Using root pointer 1002, the controller 110 can locate the media cache 616 through the pointer chain 620. In accordance with one embodiment, the location of root pointer 1002 is deterministically known by controller 110. For example, a single root pointer location can be established for storage of the root pointer 1002. In this manner, the location of root pointer 1002 is static, or substantially static, and is easily identified by controller 110. Alternatively, or in addition, root pointer 1002 can be moved by assigning a new (i.e., spare) storage location. In this manner, the controller 110 (e.g., the firmware and/or software of controller 110, etc.)

can be updated to locate the moved root pointer 1002. In one embodiment, controller 110 can locate root pointer 1002 algorithmically. In another embodiment, controller 110 can locate root pointer 1002 using updated (e.g., downloaded) firmware. It is noted that these are examples of root pointer 1002 and pointer chain 620 and are not intended to limit the scope of the concepts described herein.

FIG. 11 illustrates a method 1100 for using a media cache, under one embodiment. At step 1102, the media cache is defined by allocating a set of data blocks within the data storage system. In one embodiment, step 1102 includes designating at least one free erasure block (from the erasure block pool) per flash device, as illustrated by block 1104. Thus, each flash device includes at least one designated block of the media cache.

At step 1106, a write command is received along with data and/or metadata. At step 1108, the method 1100 determines whether to write the data and/or metadata to the main flash storage area (e.g., storage area 614). For example, step 1108 can determine that the data is not to be written to the main flash storage area if the data command comprises a small sized data write, there is a blocking resource, etc. The data and/or metadata is written at step 1109.

If the data and/or metadata is not to be written to the main flash storage area at step 1108, the method proceeds to step 1110 to store the data and/or metadata in the media cache. At step 1110, the method determines whether all of the flash devices are currently busy servicing other requests. If not all of the flash devices are busy, the method proceeds to step 1112 wherein the method writes to data blocks of the media cache on available flash devices. In one embodiment, if more than one flash device is available the method is configured to rotate through the flash devices to distribute multiple data commands. For example, a first portion of write data can be provided to a first flash device for storage to the data block(s) allocated for the media cache on the first flash device. A second portion of write data can be provided to a second flash device for storage to the data block(s) allocated for the media cache on the second flash device.

In another embodiment of step 1112, the method selects one or more of the available flash devices based on other considerations such as estimated power consumption, estimated time, and/or estimated wear that will be incurred to use the available device for caching the write data.

If all of the flash devices are busy at step 1110, the method proceeds to step 1114 wherein the method writes the data and/or metadata to blocks of the media cache on one or more of the flash devices that become available first. For example, in one embodiment if two or more flash devices become available at substantially the same time, the method can choose one or more of the flash devices based on considerations such as estimated power consumption, estimated time, and/or estimated wear that will be incurred to use the available device for caching the write data.

At step 1116, the method returns a "command complete" status to the host, but keeps the data and/or metadata in the media cache until a "write back" operation is performed at step 1118. In one embodiment, the "write back" operation at step 1118 is performed in the background.

At step 1120, the data that is "written back" to the target data blocks of the main media storage area 614 are marked as "flushed." In this manner, the data blocks in the media cache that include data that has been "flushed" can be erased and reused and/or placed in the erasure block pool, and host-queued writes can be acknowledged as "power safe", for example.

In accordance with one embodiment, when a data block on a particular device that is allocated for the media cache becomes full, additional write data is not cached in a new data block of the particular device if the write data overlaps with address ranges contained in the "older" media cache blocks that have not yet been flushed from the media cache via write backs to their target location.

In accordance with one embodiment, when data is written to the media cache, additional "metadata" is also written to the media cache. The metadata provides information for recovering the data from the media cache in the event of a power loss occurring before all write backs are complete. In one embodiment, the additional metadata includes an "order ID" such that the data can be written back in a correct order in the case of overlap in the data. For example, in some instances data pertaining to the same or similar target data blocks in the main storage area 614 can be stored to multiple data blocks in the media cache 616. When the data storage system 108 is booted, the data in the media cache is read into memory along with its metadata information. The order information is then utilized such that the write backs occur in an appropriate manner.

The implementations described above and other implementations are within the scope of the following claims.

What is claimed:

1. A device comprising:
   a memory having a plurality of data storage locations, wherein a first set of the plurality of data storage locations are allocated for a main data storage area;
   a controller configured to selectively allocate a second set of the plurality of data storage locations as a write cache; and
   an erasure block pool including some of the plurality of data storage locations, wherein the controller selectively allocates the second set of the plurality of data storage locations for the write cache from the erasure block pool.

2. The device of claim 1, wherein the memory comprises at least one non-volatile, solid-state data storage device.

3. The device of claim 1, wherein the first and second sets of the plurality of data storage locations comprise different data storage blocks of the memory.

4. The device of claim 1, wherein the controller is further configured to:
   receive a write command including user data to be written to the main data storage area; and
   store the user data in the write cache.

5. The device of claim 1, wherein the second set of the plurality of data storage locations selectively allocated for the write cache comprise at least some data storage blocks of the memory that are non-contiguous.

6. The device of claim 1, wherein the controller is further configured to maintain at least one pointer to the write cache.

7. The device of claim 6, wherein the at least one pointer comprises a pointer chain, the pointer chain including:
   a first pointer, the location of the first pointer maintained by the controller; and
   a second pointer that identifies a first data storage location in the write cache.

8. The device of claim 7, wherein the plurality of data storage locations comprise a plurality of data storage blocks, wherein each of the pointers in the pointer chain is stored in one of the data storage blocks.

9. The device of claim 1, wherein the first set of the plurality of data storage locations allocated for the main data storage area and the second set of the plurality of data storage locations allocated for the write cache are each allocated from the same erasure block pool.

10. The device of claim 1, wherein the controller selects data storage locations from the erasure block pool based on erasure counts for the data storage locations.

11. The device of claim 1, wherein the controller is further configured to re-define the write cache by selectively allocating a third set of the plurality of data storage locations, the third set of the plurality of data storage locations being different than the second set of the plurality of data storage locations.

12. The device of claim 11, wherein the controller is further configured to maintain at least one pointer to the write cache, wherein the controller marks the second set of the plurality of data storage locations such that the second set of the plurality of data storage locations are erased and returned to the erasure block pool after the at least one pointer has been modified to identify the re-defined media cache.

13. A controller comprising:
  a host interface for receiving commands and data from a host; and
  a memory interface for providing the data to at least one memory device, the at least one memory device including data storage media having a plurality of data storage locations;
  wherein the controller is configured to:
    define a media cache in the data storage media by selectively allocating a first set of the plurality of data storage locations, wherein the media cache is configured to be utilized to cache the data to be written to a main data storage area of the data storage media; and
    selectively allocate data storage locations for the media cache from an erasure block pool.

14. The controller of claim 13, wherein the media cache and the main data storage area comprise different data storage locations in the same data storage media.

15. The controller of claim 13 wherein the controller is further configured to re-define the media cache by selectively allocating a second set of the plurality of data storage locations and de-allocating the first set of the plurality of data storage locations.

16. A method comprising:
  defining a media cache by selectively allocating a first set of blocks of a data storage medium;
  storing data intended for a non-cache data storage area to the first set of blocks allocated as the media cache; and
  re-defining the media cache by selectively allocating a second set of blocks of the data storage medium, the first set of blocks being different than the second set of blocks;
  the first and second sets of blocks are allocated from an erasure block pool, the erasure block pool comprising data blocks of the data storage medium which do not contain valid data; and
  storing data intended for the non-cache data storage area to the second set of blocks allocated as the media cache.

17. The method of claim 16, wherein defining the media cache comprises selecting the first set of blocks from a plurality of data storage blocks of the data storage medium based on erasure counts of the plurality of data storage blocks.

* * * * *